April 15, 1941.   R. R. BAKER   2,238,617
AUTOMATIC COMPENSATION FOR TEMPERATURE VARIATIONS
Filed Oct. 21, 1938
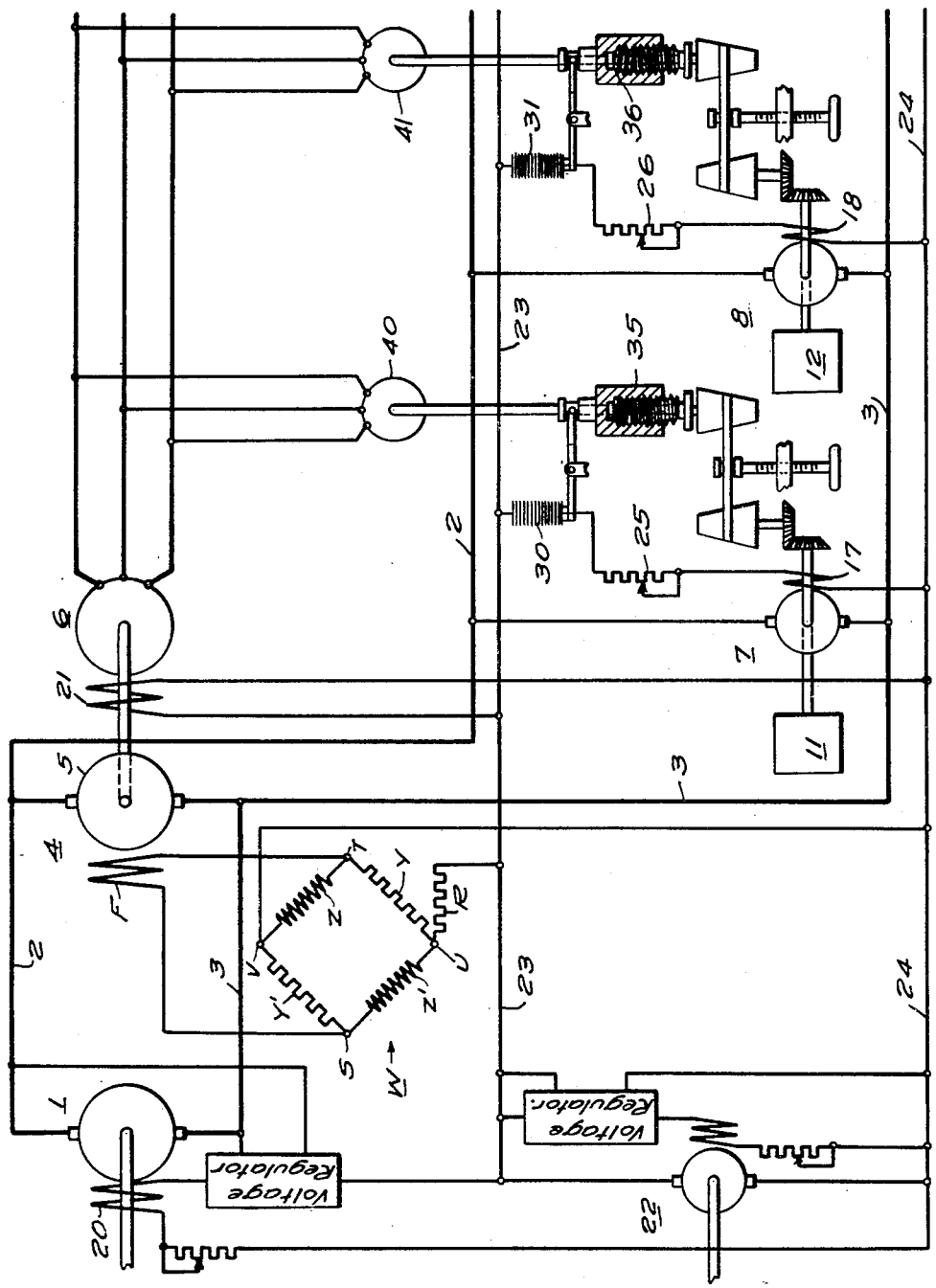
WITNESSES:
E. A. McCloskey.
INVENTOR
Rest R. Baker.
BY Paul E. Friedeman
ATTORNEY Patented Apr. 15, 1941

2,238,617

UNITED STATES PATENT OFFICE 2,238,617

AUTOMATIC COMPENSATION FOR TEMPERATURE VARIATIONS

Rest R. Baker, Swissvale, Pa., assignor to Westinghouse Electric & Manufacturing Company, East Pittsburgh, Pa., a corporation of Pennsylvania Application October 21, 1938, Serial No. 236,212

2 Claims. (Cl. 172—239)

My invention relates to speed control for motors, and more particularly provides for maintaining the speed of a motor constant though the temperature of the motor field winding and thus its resistance changes.

In the paper making industry quite a number of load units are usually driven by a like number of motors each coupled to one of the load units. To make certain that all the motors operate at the same speed, the field excitation of each motor is controlled by the speed of the motor in relation to the frequency of a master alternator. The arrangement is such that the speed difference between individual load units is substantially zero. If the frequency of the master alternator varies, the speed of all the load units goes up and down in unison. This is a very undesirable operation because the quality of the paper is altered with variations in the frequency of the master alternator, that is with variations in the speed of all the load units.

The diurnal temperature changes, or temperature changes for any other reason, affect the master motor operating the master alternator to thus produce speed variations for all the load units.

One object of my invention is to maintain the speed of a motor constant regardless of variations in temperature.

Another object of my invention is to maintain the current constant in a circuit including a conductor not having a zero temperature coefficient regardless of variations in temperature.

Another object of my invention is to provide temperature compensation for a motor field circuit.

A still further object of my invention is to maintain the speed of a plurality of load units at a given value with reference to a fixed object.

Other objects and advantages will become apparent from a study of the following specification taken in conjunction with the accompanying single figure illustrating one application of my invention.

Referring to the figure, reference character 1 designates a main generator of direct current energy. This generator is provided with a voltage regulator as shown which maintains the voltage of buses 2 and 3 constant.

A master motor 4 has its armature winding 5 connected directly to buses 2 and 3. This motor is thus provided with constant voltage at its armature winding. The motor 4 drives a master alternator 6, the frequency of which is to be maintained constant. The armature windings of the load unit motors 7, 8, etc., are also connected to the buses 2 and 3 and are thus supplied with constant voltage. These motors drive load units 11, 12, etc.

To energize the field windings 17, 18, etc., of the load unit motors, and the field windings 20, F, and 21 of the main generator 1, master motor 4, and master alternator 6, respectively, I provide an exciter 22. This exciter has a voltage regulator, as shown, interconnected with the armature and field terminals of the exciter, for maintaining the voltage of the buses 23 and 24 of the exciter constant.

The field windings 17, 18, etc., are connected to buses 23 and 24 through adjustable resistors 25, 26, etc., and carbon pile regulators 30, 31, etc. The carbon pile regulators are controlled from differentials 35, 36, etc. Each of these differentials is driven from a load unit motor through an adjustable speed drive as shown and from a synchronously operating motor connected to the master alternator. These synchronously operating motors are designated by reference numbers 40, 41, etc.

From the arrangement shown, it will be apparent that the speed of the load units is determined by the frequency of the master alternator, which is in turn determined by the speed of the master motor 4. With prior art control schemes, the speed of this master motor could not be kept constant with variations in temperature.

With my system of control, I connect the field F to the buses 23 and 24 through the circuit arrangement shown at W, which circuit arrangement has the appearance of a Wheatstone bridge but actually is not such a bridge because the field terminals are not connected at balanced points on the bridge but at non-balanced points S and T.

I am using letters as reference characters for my contribution to the art to better distinguish the elements of my control from the equipment which by itself is old.

The circuit including the points S and T may be traced from bus 23 through a resistor R, having a zero temperature coefficient, through a pair of series connected resistors Y and Z, including point T between them, connected in parallel, between junctions U and V, with a pair of series connected resistors Z' and Y', including point S between them. Resistors Y and Y' have zero temperature coefficients whereas resistors Z and Z' have their resistance characteristics matched to the resistance characteristics of the field F.

Resistors Z and Z' may be copper wire like the conductors of the field winding F and may, like the field F, in size be selected from standard copper wire sizes readily available on the open market. Resistor R is selected in resistance value to provide a given desired voltage across junctions U and V.

The conductors for the resistors Z and Z' and the field need not be copper because any other selection may be made provided the selection is so made that in conjunction with resistors Y and Y' connected as shown the voltage across points S and T varies with variations in temperature to just compensate for the resistance variations in the field winding. I accomplish this compensation with my control scheme in a cheap manner and by merely selecting readily available standard materials.

The man skilled in the art may, once having been shown my circuit arrangement and apprised of its characteristics, need no further explanation of my invention to fully appreciate its novelty and advantages, however, to dispel any doubt, attention is called to the following analytic proofs.

Let $x = 220$ the voltage across U and V
$a =$ current in Y
$b =$ current in Z
$c =$ current in Z'
$d =$ current in Y'
$e =$ current in field F
$y = 25.2$ ohmic resistance of Y and Y'
$z = 203.5$ ohmic resistance of Z and Z', and
$f = 22.25$ ohmic resistance of field F To facilitate the analysis, the resistances of Z and Z' and Y and Y', respectively, are selected as equal.

Then (1) $\quad x = ya + zb$ (2) $\quad x = zc + yd$ (3) $\quad x = ya + fe + yd$ (4) $\quad a = b + e$ (5) $\quad d = c + e$ (6) Subtracting (4) from (5) and changing the position of the terms.

$$0 = a - b - d + c$$

(7) Multiplying (6) by $y$ $$0 = ya - yb - yd + yc$$

(8) Subtracting (2) from (1)

$$0 = ya + zb - yd - zc$$

(9) Subtracting (8) from (7) and transposing $$b(y+z) = c(y+z)$$

(10) Dividing (9) by $(y+z)$ $$b = c$$

(11) Substituting $c$ for $b$ in (4)

$$a = c + e$$

(12) From (5) $c + e = d$, therefore $$a = d$$

(13) Substituting (12) in (3) and collecting $$x = 2ya + fe$$

(14) Substituting the values of $e$ from (4) in (13) and collecting $$x = a(2y+f) - fb$$

(15) Multiplying (14) by $z$ $$xz = za(2y+f) - zfb$$

(16) Multiplying (1) by $f$ $$fx = fay + fzb$$

(17) Adding (15) and (16) and solving for $a$ $$a = \frac{x(z+f)}{z(2y+f)+fy} = d$$

(18) Substituting the values of $f$, $x$, $y$ and $z$ in (17) and solving for $a$ $$a = 3.236 \text{ amperes}$$

(19) Substituting the values of $a$, $y$ and $z$ in (1) and solving for $b$, $$b = .680 \text{ ampere}$$

(20) Substituting the values of $a$ and $b$ in (4) and solving for $e$, $$e = 2.556 \text{ amperes}$$

It is well known that the temperature coefficient of copper is very near .004 per centigrade degree change of temperature. Assuming that the temperature of the field F and resistors Z and Z' changes 15+ centigrade, then the new resistance of the resistors, namely, $z_1$, will be given by:

(21) $\quad z_1 = 203.5(1 + .004 \times 15) = 215.71$ ohms

(22) Similarly, $$f_1 = 22.25(1 + .004 \times 15) = 23.585$$

(23) Substituting the new values of $z_1$ and $f_1$ in (17) and solving for the new $a$, namely $a_1$, $$a_1 = 3.15 = d_1$$

(24) Substituting the new values $a_1$ in (1), and solving for $b_1$, $$b = .647 \text{ ampere}$$

(25) Substituting the values of $a_1$ and $b_1$ in (4) and solving for $e_1$, $$e_1 = 2.533$$

(26) $e - e_1 = 2.556 - 2.533 = .023$, which is, of course, a very small change in field current and the speed of master motor 4 thus remains substantially constant.

If my circuit arrangement is not used and yet the same voltage of 56.875 volts (This value can, by one skilled in the art, readily be determined from the values hereinbefore given and calculated.) were impressed across junctions S and T and thus the field F for normal operation at the normal, or average, temperature to get the field current of 2.556 amperes then for a 15° centigrade rise in temperature the new field current would be $$= \frac{56.875}{23.585} = 2.441$$

The normal field current less this last mentioned new field current is $$= 2.556 - 2.411 = .145$$

It will be noted that this difference is substantially seven times as great as the difference apparent from Equation 26. The speed variations for the most favorable conditions without my scheme of control is thus at least seven times as great as with my system of control.

In actual former practice a field winding is used having a much higher resistance than the resistance herein given and a higher voltage is impressed across it to get the same excitation effect. It is thus apparent that the temperature actually affects the speed much more than for the most favorable condition assumed for a control not using my invention. The speed variation may thus be from a minimum of seven times to thirty or forty times as much as with my control.

Assuming that a certain required quality of paper permits only a maximum total speed variation of four revolutions per minute over a twenty-four hour day. If my system of control maintains the speed constant within one revolution per minute for the entire temperature change of a day, then it is apparent that no other equipment than mine can produce the desired high quality paper.

In the calculations hereinbefore given, some actual practical values of resistance and voltage were chosen from standard wire sizes available on the open market and from standard practice. My invention is, however, not limited to any particular resistance values or wire sizes. Theoretically my scheme of control can, by a proper drawing of the wire size, or the proper selection of metals with the desired temperature coefficients, or the selection of the desired length or the combination of any two or all of these variations, produce absolutely constant field current, so that the speed of the system remains absolutely constant regardless of the temperature changes to which the field F is subjected.

The mathematical analysis merely shows examples but briefly and concisely stated, my invention provides for connecting one terminal of a motor field winding, or other circuit, between two connected resistors, one of which has a zero temperature coefficient and the other of which has its resistance characteristics matched to the resistance characteristics of the field winding, and provides for connecting the other field terminal between two other connected resistors, one of which has a zero temperature coefficient and the other of which has its resistance characteristics matched to the resistance characteristics of the field winding, and provides for connecting the two sets of resistors in parallel to a source of direct current electrical energy of constant voltage and with corresponding ends of the resistors connected to opposite polarity.

Preferably, though not necessarily, the resistance values of the resistors having like temperature coefficients should be equal. This manner of selecting the resistance for the resistor makes the design calculations for the system easier.

I am, of course, aware that others skilled in the art, particularly after having had the benefit of the teachings of my invention, can devise similar circuit arrangements for accomplishing the same and similar results. I, therefore, do not wish to be limited to the specific showing made or the particular resistance values or metals mentioned, because silver, aluminum, and other metals are satisfactory conductors, and other resistance values for the units are also satisfactory.

I wish to be limited only by such prior art as may be pertinent and by the scope of the claims hereto appended.

I claim as my invention:

1. In an electric motor control system for maintaining the current in the field winding of a motor constant, in combination, a source of direct-current of constant voltage, a motor field winding, including standard electrical conductors that are readily available on the open market, the field winding thus having conventional temperature responsive resistance characteristics, through which field winding the current is to be maintained constant regardless of variations in temperature, a pair of resistors connected in series and connected to said source of constant voltage, one of said resistors having a zero resistance temperature coefficient and the other resistor being selected from standard electrical conductors readily available on the open market and so selected as to have temperature responsive resistance characteristics that are matched to the temperature responsive resistance characteristics of the field winding, a second pair of similar resistors connected in series and in opposite order to said source of constant voltage, and means for connecting the field winding across the series interconnections of the respective pair of resistors.

2. A circuit arrangement like a Wheatstone bridge, for controlling the excitation of a motor field, in combination, an electric motor having a field winding, a source of constant voltage direct-current electric energy, a pair of resistors having zero resistance temperature coefficients and of equal resistance value connected in opposite legs of the bridge, a pair of control resistors connected in the remaining opposite legs of the bridge, means for connecting said source of constant voltage direct-current energy to two of the opposite junctions of the bridge, and means for connecting the motor field winding to the remaining two opposite junctions of the bridge, said control resistors having resistances of equal value and having temperature responsive resistance characteristics matched to the temperature responsive resistance characteristics of the field winding so that the voltage changes on the said remaining two opposite junctions of the bridge, due to variations in ambient temperature, are directly proportional to variations in resistance losses in the field winding due to changes in ambient temperature.

REST R. BAKER.